US008267663B2

(12) United States Patent
Larose et al.

(10) Patent No.: US 8,267,663 B2
(45) Date of Patent: Sep. 18, 2012

(54) MULTI-CAST TURBINE AIRFOILS AND METHOD FOR MAKING SAME

(75) Inventors: Joël Larose, Longueuil (CA); Ghislain Plante, Verdun (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1178 days.

(21) Appl. No.: 12/110,635

(22) Filed: Apr. 28, 2008

(65) Prior Publication Data

US 2009/0269193 A1    Oct. 29, 2009

(51) Int. Cl.
*F01D 5/28*    (2006.01)

(52) U.S. Cl. .................... 416/213 R; 416/241 R

(58) Field of Classification Search ............. 416/241 R, 416/223 R, 213 R
See application file for complete search history.

(56) References Cited

U.S. PATENT DOCUMENTS

| 3,394,918 | A | * | 7/1968 | Wiseman ................. 416/241 R |
| 3,982,854 | A | | 9/1976 | Berry et al. |
| 4,883,216 | A | | 11/1989 | Patsfall |
| 4,964,564 | A | | 10/1990 | Neal et al. |
| 5,183,390 | A | | 2/1993 | Amos |
| 5,253,978 | A | | 10/1993 | Fraser |
| 5,314,106 | A | | 5/1994 | Ambroziak et al. |
| 5,551,623 | A | | 9/1996 | Collot et al. |
| 6,468,040 | B1 | * | 10/2002 | Grylls et al. ................. 416/224 |
| 6,558,119 | B2 | * | 5/2003 | Lee et al. ................... 416/97 R |
| 6,666,653 | B1 | * | 12/2003 | Carrier ...................... 416/213 R |
| 6,883,700 | B2 | | 4/2005 | Kottilingam et al. |
| 7,021,899 | B2 | | 4/2006 | Ferte et al. |
| 7,125,227 | B2 | | 10/2006 | Adde et al. |
| 7,128,536 | B2 | | 10/2006 | Williams et al. |
| 2005/0091848 | A1 | * | 5/2005 | Nenov et al. ................. 29/889.1 |

FOREIGN PATENT DOCUMENTS

GB        1081073        8/1967

* cited by examiner

*Primary Examiner* — Ninh H Nguyen

(74) *Attorney, Agent, or Firm* — Norton Rose Canada LLP

(57) ABSTRACT

A gas turbine engine airfoil is made from separate cast sections having different cast alloy structures. The cast alloy structures are selected on the basis of the local operating conditions of each section. Friction welding can be used to join the sections together.

16 Claims, 5 Drawing Sheets

MULTI-CAST TURBINE AIRFOILS AND METHOD FOR MAKING SAME

TECHNICAL FIELD

The application relates generally to turbine airfoils and, more particularly, to a multi-cast turbine airfoil having sections customized to their local limiting factors.

BACKGROUND OF THE ART

Conventional turbine blades and vanes are typically made from a single alloy casting. With the ever increasing operating temperatures and rotational speeds of modern gas turbine engines, it has become increasingly challenging to select one material meeting all the operating requirements. Accordingly, when selecting a superalloy for turbine blade or turbine vane applications, one must often make a compromise.

Accordingly, there is a need to provide a new airfoil structure addressing the above mentioned concerns.

SUMMARY

In one aspect, there is provided a method of providing a multi-material turbine airfoil having a tip and a root spaced-apart along a spanwise direction of the airfoil, the method comprising: a) identifying airfoil sections in the spanwise direction subject, in use, to different conditions; b) selecting different cast alloy materials for the airfoil sections identified in a), the different cast alloy materials being selected in accordance with the conditions encountered by each of the identified airfoil; c) casting the airfoil sections; and d) friction welding the airfoil sections in an end-to-end relationship along the spanwise direction of the airfoil.

In a second aspect, there is provided a method of providing a multi-alloy turbine airfoil, comprising conceptually dividing the airfoil along a spanwise direction into sections subjected to different conditions during engine operation, individually selecting cast alloy materials suited for each of the sections, separately casting the sections with the cast alloy materials selected for each particular section, and friction welding the different sections together.

In a third aspect, there is provided a method for making a multi-cast turbine airfoil, the method comprising: casting a first airfoil section with a first alloy, casting a second airfoil section with a second alloy, the first and second alloys having different properties and being respectively selected as a function of the conditions encountered by the first and second airfoil sections, and friction welding the first airfoil section to the second airfoil section in a plane normal to a span direction of the turbine airfoil.

In a fourth aspect, there is provided a gas turbine engine airfoil comprising a tip portion having a first cast alloy structure joined at a first friction weld to an intermediate airfoil portion having a second cast alloy structure, and a fixing portion having a third cast alloy structure, the fixing portion being joined at a second friction weld to the intermediate airfoil portion, said first, second and third cast alloy structures having different properties respectively suited for the conditions prevailing at the tip portion, the intermediate portion and the fixing portion of the gas turbine engine airfoil.

DESCRIPTION OF THE DRAWINGS

Reference is now made to the accompanying figures, in which.

DETAILED DESCRIPTION OF THE PREFERRED EMBODIMENTS

Figure 1:
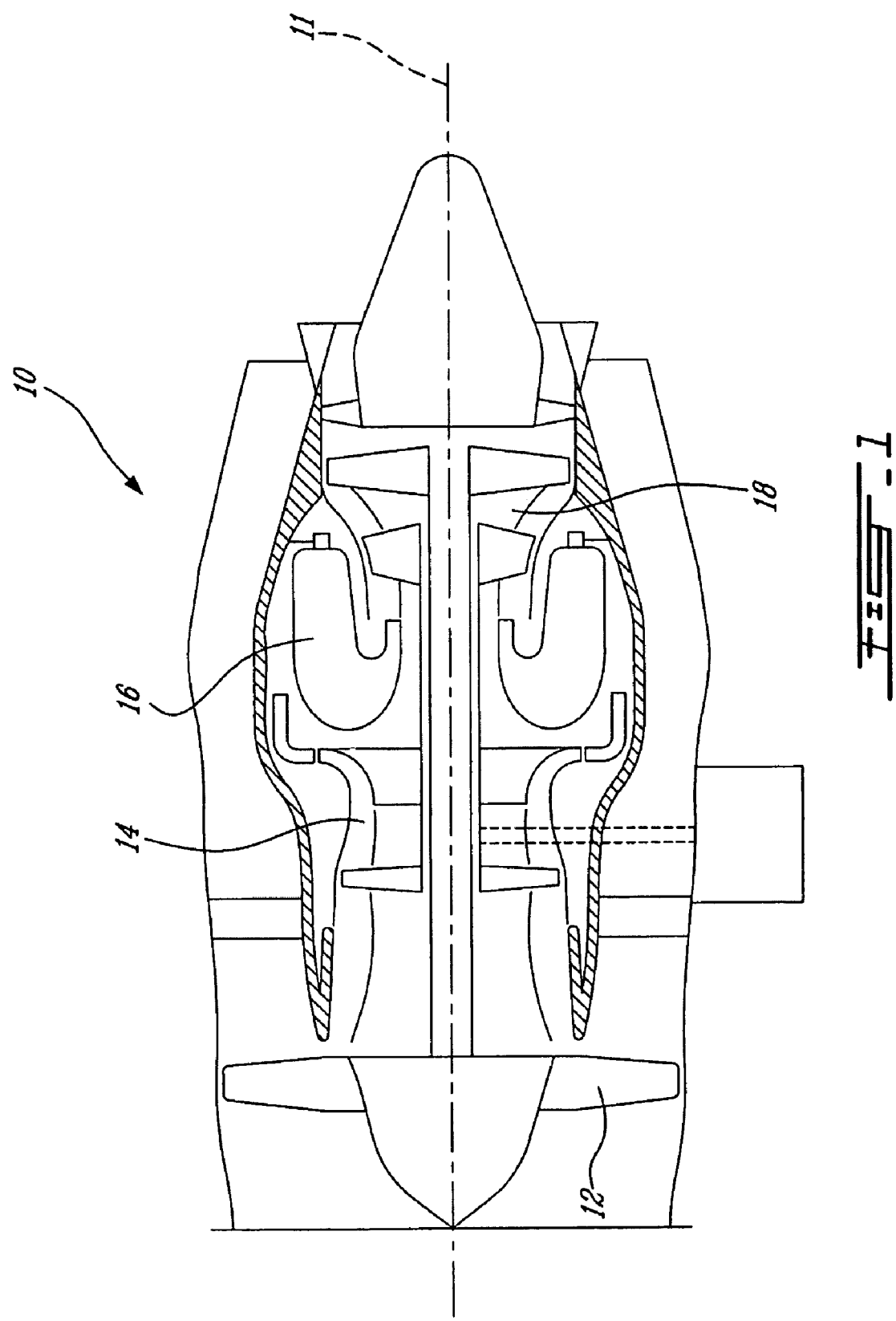
FIG. 1 is a schematic sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The compressor and turbine sections 14 and 18 both include rotors mounted for rotation about a central axis 11 of the engine 10.

Figure 2:
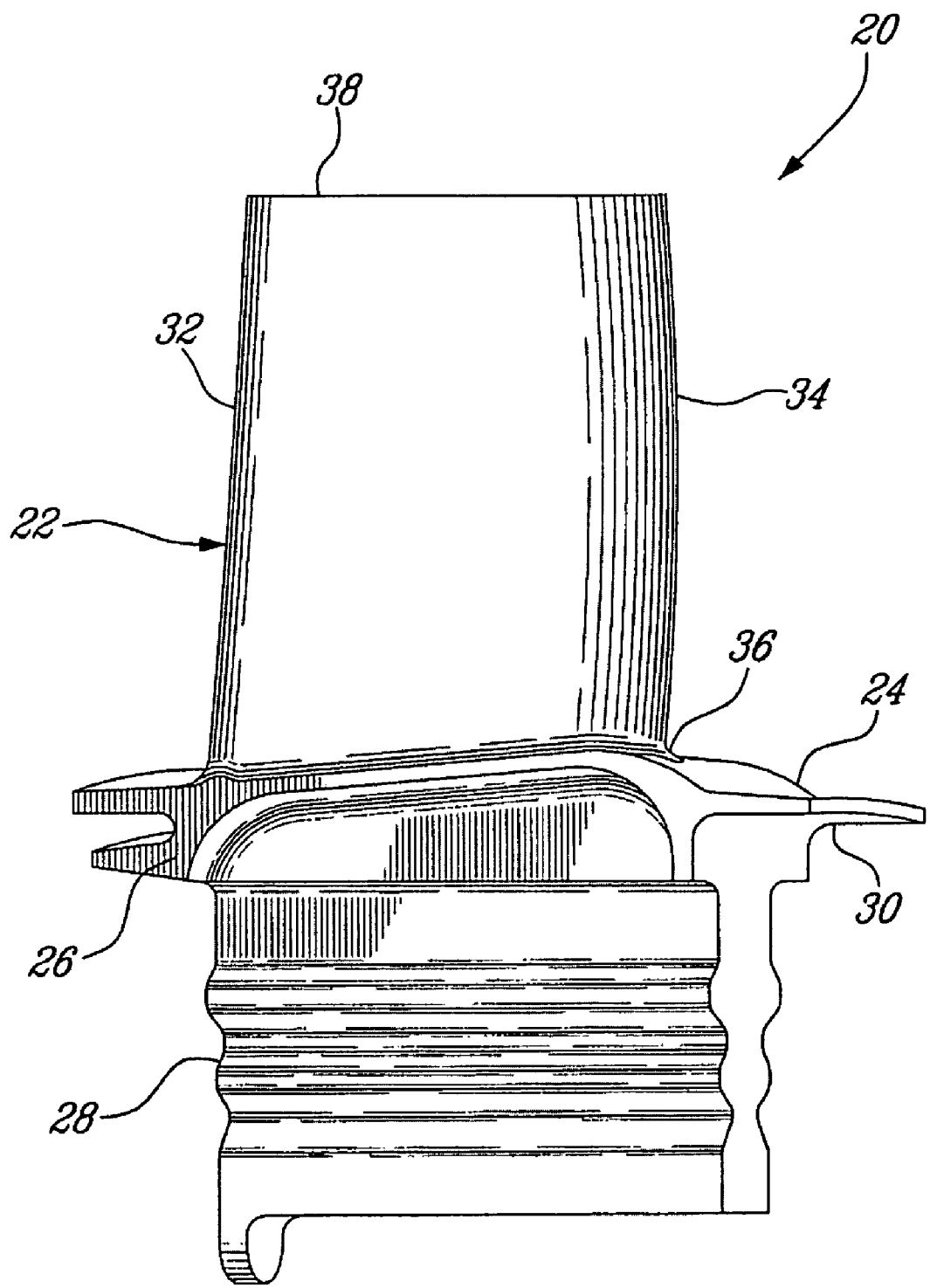
FIG. 2 is a schematic isometric view of a multi-cast turbine blade.

The turbine section 18 comprises, among others, a plurality of airfoil members, including stationary vanes and rotating blades. FIG. 2 illustrates one example of a turbine blade 20. The turbine blade 20 generally comprises an airfoil portion 22 extending from a top or gaspath side surface 24 of a platform 26 and a root fixing portion 28 (sometimes referred to as a dovetail) depending from an undersurface 30 of the platform 26 and adapted for interlocking engagement in a corresponding slot (not shown) defined in the periphery of the hub of a turbine rotor (not shown). The airfoil portion 22 has opposed pressure and suction sides extending chordwise between a leading edge 32 and a trailing edge 34 and spanwise between a root 36 and a tip 38.

It has been observed that the conditions encountered by the blade 20 during engine operation vary, notably, in the spanwise direction. For instance, the tip section of the blade 20 operates at high temperatures and relatively low nominal stresses and, thus, requires good oxidation resistance, but less creep resistance. The midspan section of the airfoil portion 22 is operating at lower temperatures, but at higher nominal stresses, therefore requiring better creep resistance and lower oxidation resistance. The root or fixing portion 28 is usually limited by its cycle fatigue properties due its use in service under higher loads and at lower temperatures. Other conditions beside temperature and stress loading can be considered in selecting a material for a given section of the blade. For instance, providing a tip which is more wear-resistant than a middle section might be a criteria that will influence the choice of material.

Figure 3A:
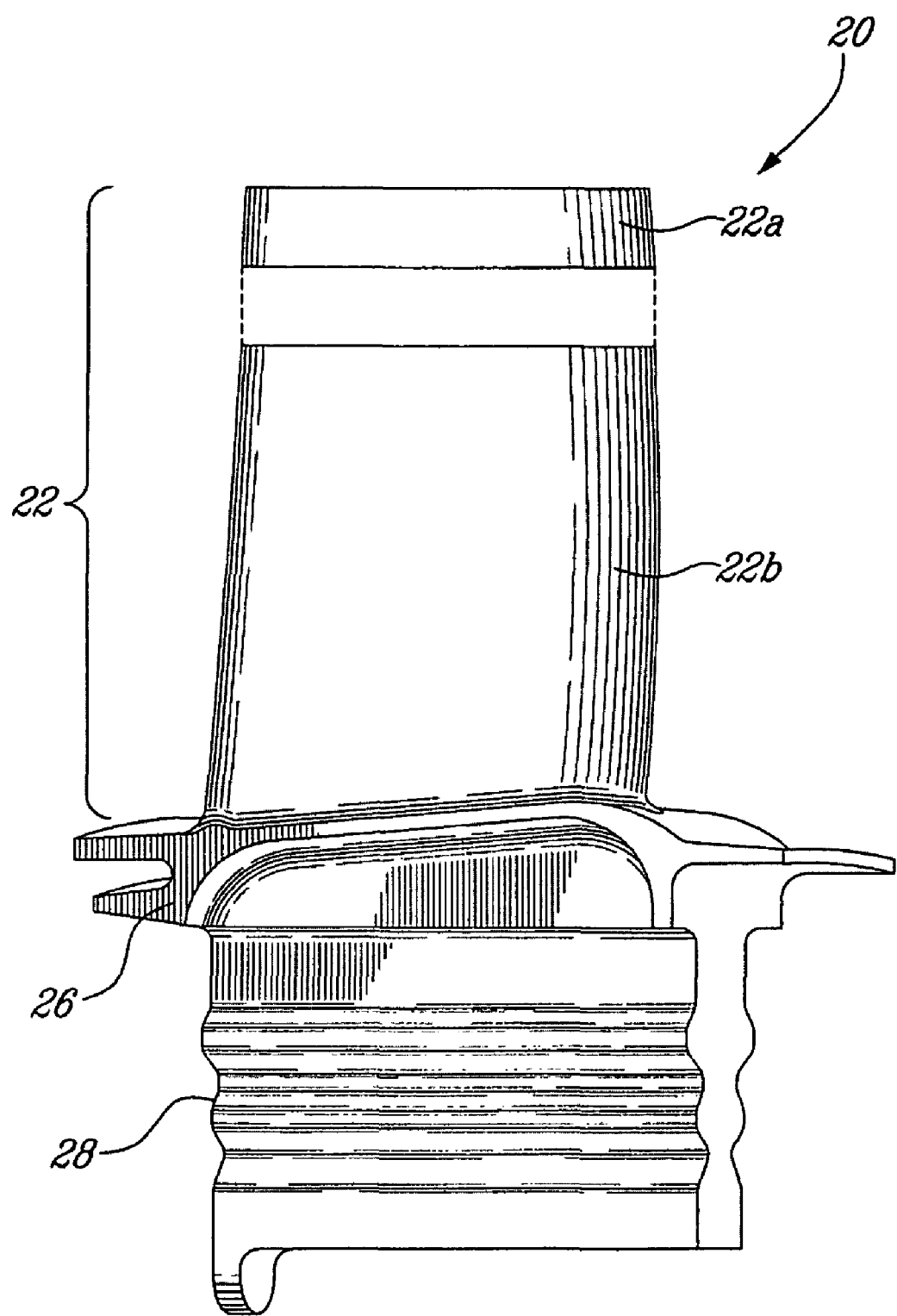
FIGS. 3a, 3b and 3c are schematic isometric views illustrating various castings that may compose the turbine blade.
Figure 3B:
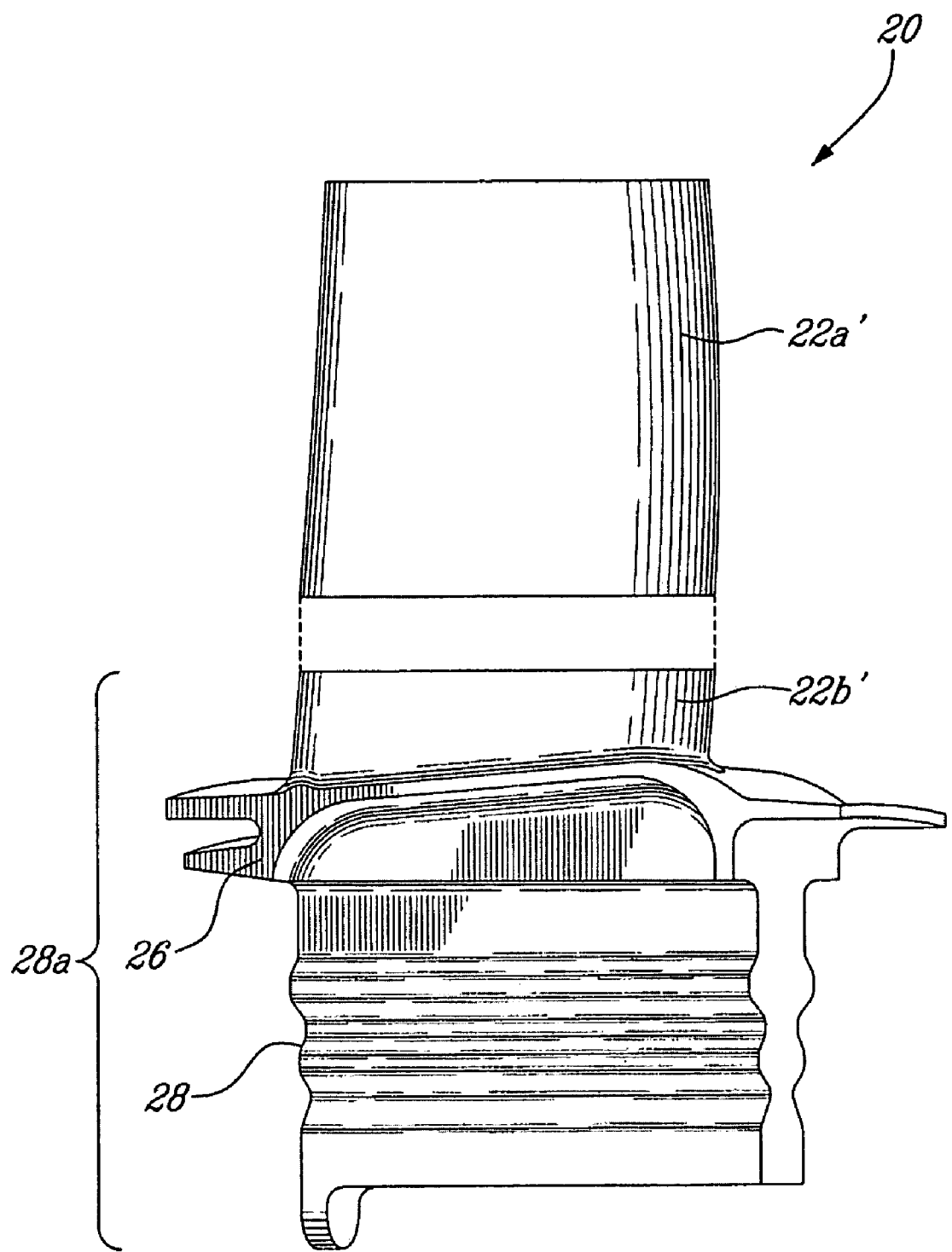
Figure 3C:
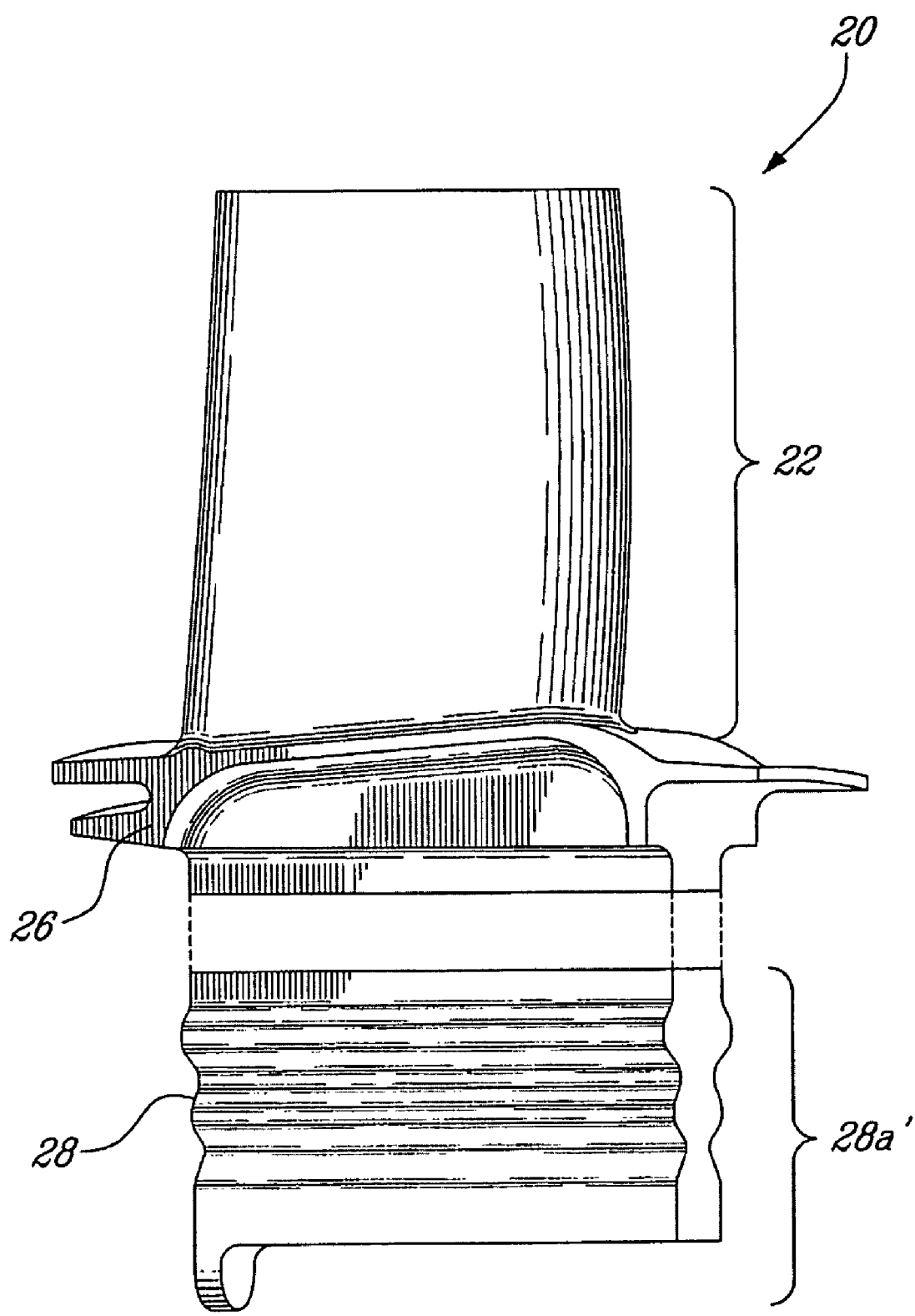

The above conditions demand different properties for different sections of the blade, which properties can only be optimally provided by different materials. As shown in FIGS. 3a, 3b and 3c, it is herein proposed to conceptually divide the blade 20 along the spanwise direction into a number of sections demanding different properties. After having identified and delimited the sections, the material suited to meet the requirements of a particular section is selected, and the so individually customized sections are separately cast before being appropriately joined together into a multi-cast blade component.

As shown in FIG. 3a, a tip section 22a of the blade 20 can be cast separately from a remaining section 22b of the airfoil portion 22. This provides for the manufacturing of the tip section 22a from a cast material customized to the local operating conditions encountered by the tip section 22a of the airfoil portion 22. The tip section 22a could, for instance, be made of a polycrystalline alloy or a single crystal alloy, such as PWA1484, tailored to the high temperature conditions it encounters during engine operation.

According to a further example shown in FIG. 3b, a lower section 28a of the blade 20, including the fixing portion 28, the platform 26 and a base airfoil portion 22b' projecting upwardly from the platform 26, is cast separately from a remaining top airfoil section 22a'. Alternatively, as shown in FIG. 3c, the blade lower casting 28a' could solely include the blade fixing 28 with the bonding plane of the lower casting 28a' with the remaining portion of the blade 20 located underneath the platform 26 just above the top serration of the blade fixing 28. In these two illustrated examples, the lower casting 28a, 28a' is made of a cast alloy having high cycle fatigue resistance properties. A single crystal alloy, a directionally-solidified alloy or a polycrystalline alloy are among the material that could be used for the lower casting 28a, 28a'. The lower castings 28a, 28a' could, for instance, be made from PWA1480.

The skilled person in the art will also understand that any combinations of the above disclosed blade segmentations are feasible. For instance, a further example could be to separately cast the tip section and the fixing section out of different materials respectively suited to meet the requirements specific to each section and to joined them at the opposed ends of a third sub-component casting corresponding to an intermediate or midspan section of the blade, which is also customized to its local limiting factors.

After having been individually cast, the various blade sections 22a, 22b, 22a' 28a, 28a' are joined together in a multi-cast blade configuration to form blade 20, as shown in FIG. 2. The bonding plane between each pair of adjacent blade sections is normal to the spanwise direction of the blade and extends generally from the leading edge 32 to the trailing edge of the blade 20 in the chordwise direction. Linear friction welding (LFW) can be used to join the blade sections together. LFW is a process that uses friction to generate enough heat to bond two materials together, but without reaching the melting point of either material. LFW avoids polycrystalline re-crystallisation of the cast single crystal blade sections during the joining process. LFW thus provides for the preservation of the mechanical properties of the single crystal or directionally-solidified alloys composing each section of the blade. Any other joining process providing for reliable joining of the various sections without affecting the properties of the individual sections could be used as well. Linear friction welding could also be thermally assisted by external energy input sources, such as local electron beam, laser beam or induction heating, which could be used to increase the temperature of the parts to be joined, while remaining below their melting temperature.

The flash generated during the joining process, including the flash material in the internal air feed passage of the blade, if any, can be removed in a variety of ways, such as local machining techniques, such as electro-disharge machining or micro-machining for accessible internal passages and by machining, grinding, electro-discharge machining for the external surfaces.

The present method could also be used for repair of worn or damaged sections of an airfoil component. The damaged portion of the component would first be removed and LFW could be used to join a new cast section onto the remaining portion of the component. The new cast section could be cast out of a material tailored to the local limiting factors and that even though the original airfoil component had a single alloy structure.

As apparent from the above description, the customization of the properties through the appropriate joining of different cast alloys for different sections of the airfoil component provides for improved oxidation life, improved fatigue life and improved durability. It also contributes to increase the engine efficiency by allowing for higher operating temperatures and rotational speeds.

The above description is meant to be exemplary only, and one skilled in the art will recognize that changes may be made to the embodiments described without departing from the scope of the invention disclosed. For example, it is understood that the same principles and concepts are not limited to turbine blade application, but could also be applied to other turbine component, including turbine vanes. Still other modifications which fall within the scope of the present invention will be apparent to those skilled in the art, in light of a review of this disclosure, and such modifications are intended to fall within the appended claims.

What is claimed is:

1. A method of providing a multi-material turbine airfoil having a tip and a root spaced-apart along a spanwise direction of the airfoil, the method comprising: a) identifying airfoil sections in the spanwise direction subject, in use, to different conditions, the airfoil sections comprising a tip section, a midspan section and a root fixing section; b) selecting three different cast alloy materials respectively suited for the conditions encountered by the tip, midspan and rood fixing sections identified in a); c) casting the airfoil sections; and d) friction welding the airfoil sections in an end-to-end relationship along the spanwise direction of the airfoil, including friction welding the tip section and the root fixing section to opposed ends of the midspan section.

2. The method defined in claim 1, wherein the turbine airfoil has a platform, and wherein d) comprises joining the root fixing section to the midspan section of the turbine airfoil along a joining line extending chordwise through the airfoil above the platform.

3. The method defined in claim 1, wherein the turbine airfoil has a platform, and wherein d) comprises joining the root fixing section to the midspan section of the turbine airfoil along a joining line extending chordwise through the airfoil below the platform in a shank portion of the airfoil.

4. The method defined in claim 1, comprising removing a damaged section of the airfoil; selecting a cast alloy material suited for the local condition encountered by the damaged part; using the selected cast alloy material, casting a new section corresponding to the damaged section, and friction welding the new section to a remaining portion of the gas turbine airfoil.

5. The method defined in claim 1, comprising considering a spanwise temperature distribution in the airfoil during engine operations, and taking into account the temperature distribution in the selection of material.

6. The method defined in claim 1, wherein the tip section comprises a first single crystal alloy, the midspan section comprises a second single crystal alloy, and the root fixing portion comprises a third single crystal alloy, a directionally-solidified alloy or a polycrystalline alloy.

7. A method as defined in claim 1, wherein the tip section is made of a first cast alloy material selected for its oxidation resistance properties, whereas the root fixing section is made of a second cast alloy material selected for its fatigue resistance properties.

8. A method of providing a multi-alloy turbine airfoil, comprising conceptually dividing the airfoil along a spanwise direction into a tip section, a midspan section and a root fixing section, the tip, midspan and root fixing sections being subjected to different conditions during engine operation; individually selecting different cast alloy materials respectively suited for the conditions encountered by the tip section, the midspan section and the root fixing section; separately casting the sections with the cast alloy materials selected for each particular section, and friction welding the tip section and the root fixing section to opposed ends of the midspan section.

9. The method defined in claim 8, wherein the tip section is made of a first single crystal alloy, the midspan section is made of a second single crystal alloy, and the root fixing portion is made of a third single crystal alloy, a directionally-solidifed or an equiaxed alloy.

10. The method defined in claim 8, wherein the alloys used are nickel-based.

11. A method for making a multi-cast turbine airfoil, the method comprising: casting a first airfoil section with a first alloy, casting a second airfoil section with a second alloy, the first and second alloys having different properties and being respectively selected as a function of the conditions encountered by the first and second airfoil sections, friction welding the first airfoil section to the second airfoil section in a plane normal to a span direction of the turbine airfoil, and casting a third airfoil section with a third alloy, and friction welding said third airfoil section to said second airfoil section.

12. The method defined in claim 11, wherein the bonding plane extends from a leading edge to a trailing edge of the airfoil.

13. The method defined in claim 11, wherein said first, second and third airfoil sections respectively correspond to a tip portion, a midspan portion and a root portion of the turbine airfoil.

14. A gas turbine engine airfoil comprising a tip portion having a first cast alloy structure joined at a first friction weld to an intermediate airfoil portion having a second cast alloy structure, and a fixing portion having a third cast alloy structure, the fixing portion being joined at a second friction weld to the intermediate airfoil portion, said first, second and third cast alloy structures having different properties respectively suited for the conditions prevailing at the tip portion, the intermediate portion and the fixing portion of the gas turbine engine airfoil.

15. The gas turbine engine airfoil as defined in claim 14, wherein the first cast alloy structure being selected for its resistance to oxidation, the second cast alloy structure being selected for its resistance to creep, and the third cast alloy structure being selected for its resistance to fatigue.

16. A method of providing a multi-material turbine airfoil having a tip and a root spaced-apart along a spanwise direction of the airfoil, the method comprising: a) identifying airfoil sections in the spanwise direction subject, in use, to different conditions; b) selecting different cast alloy materials for the airfoil sections identified in a), the different cast alloy materials being selected in accordance with the conditions encountered by each of the identified airfoil; c) casting the airfoil sections; and d) friction welding the airfoil sections in an end-to-end relationship along the spanwise direction of the airfoil; and wherein b) comprises considering a spanwise temperature distribution in the airfoil during engine operations, and taking into account the temperature distribution in the selection of material.

\* \* \* \* \*